US008760117B2

United States Patent
Hankui

(10) Patent No.: US 8,760,117 B2
(45) Date of Patent: *Jun. 24, 2014

(54) PORTABLE COMMUNICATION APPARATUS

(75) Inventor: Eiji Hankui, Tokyo (JP)

(73) Assignee: NEC Corporation, Tokyo (JP)

( * ) Notice: Subject to any disclaimer, the term of this patent is extended or adjusted under 35 U.S.C. 154(b) by 156 days.

This patent is subject to a terminal disclaimer.

(21) Appl. No.: 13/175,383

(22) Filed: Jul. 1, 2011

(65) Prior Publication Data

US 2011/0269512 A1 Nov. 3, 2011

Related U.S. Application Data

(62) Division of application No. 10/592,704, filed as application No. PCT/JP2005/004575 on Mar. 15, 2005, now Pat. No. 7,994,753.

(30) Foreign Application Priority Data

Mar. 15, 2004 (JP) .................................. 2004-072865

(51) Int. Cl.
*H02J 7/00* (2006.01)
(52) U.S. Cl.
USPC ........................... 320/112; 320/114; 320/135
(58) Field of Classification Search
USPC .................. 320/112, 114, 127, 135; 455/572
See application file for complete search history.

(56) References Cited

U.S. PATENT DOCUMENTS

| 6,115,620 | A | * | 9/2000 | Colonna et al. ............. 455/569.1 |
| 7,994,753 | B2 | * | 8/2011 | Hankui ......................... 320/112 |
| 2002/0039671 | A1 | | 4/2002 | Yanagisawa |
| 2003/0165736 | A1 | | 9/2003 | Hiratsuka |

FOREIGN PATENT DOCUMENTS

| CN | 1469669 | | 1/2004 |
| JP | 2002-110258 | A | 4/2002 |
| JP | 2003-249208 | | 9/2003 |
| JP | 2003-303580 | | 10/2003 |
| JP | 2003-348202 | | 12/2003 |

* cited by examiner

*Primary Examiner* — Edward Tso
*Assistant Examiner* — Aaron Piggush
(74) *Attorney, Agent, or Firm* — Young & Thompson

(57) ABSTRACT

A battery pack has a case for storing a battery can, and a metal plane made of a conductive material and connected to the battery can in high frequency is provided on the outer circumference plane of the case. A mounting recessed part for removably mounting the battery pack is provided, and a printed circuit board is provided inside. In the mounting recessed part, a plurality of grounding terminals are electrically connected to a grounding layer of the printed circuit board, on an inner plane to which the metal plane of the battery pack abuts. When the battery pack is mounted in the mounting recessed part, electricity is carried between the metal plane and the grounding terminals, and the metal plane and the battery can are grounded to the grounding layer of the printed circuit board in high frequency.

7 Claims, 15 Drawing Sheets

F I G. 3
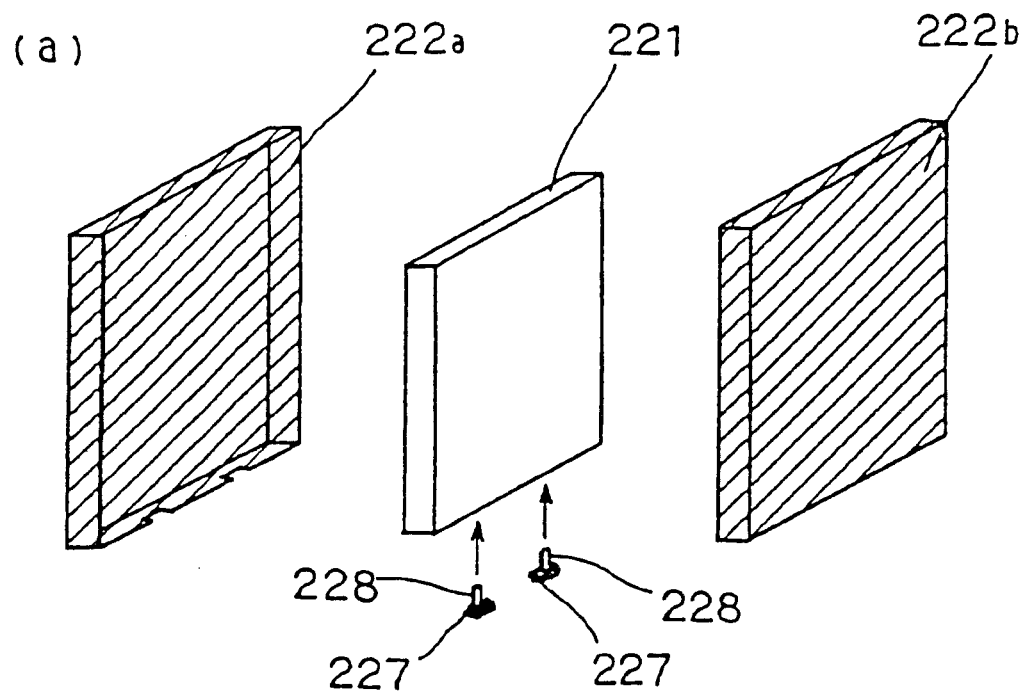
(a)
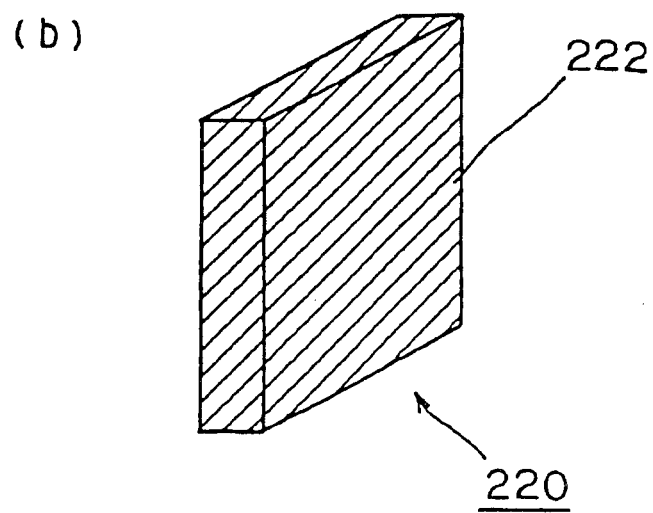
(b)

F I G. 4
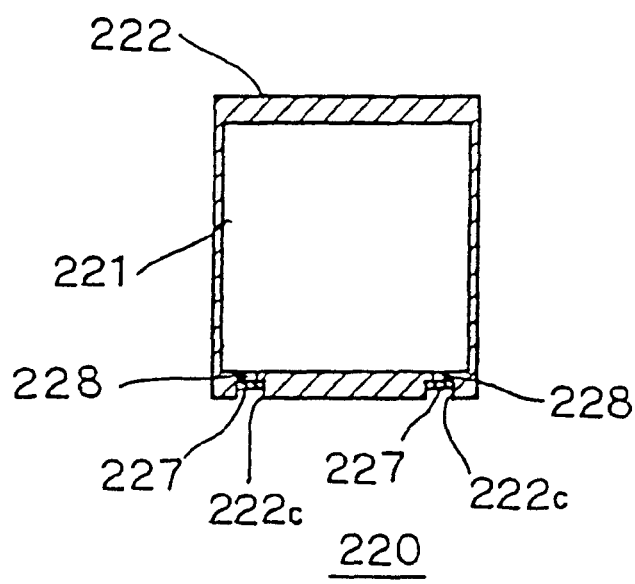
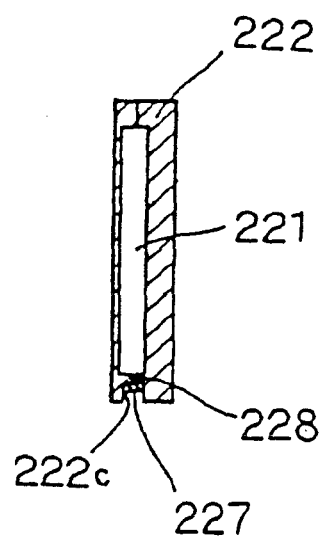
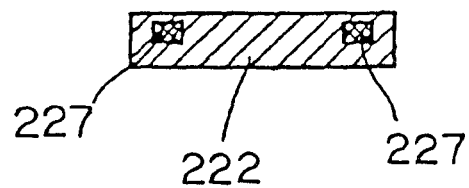

F I G. 7
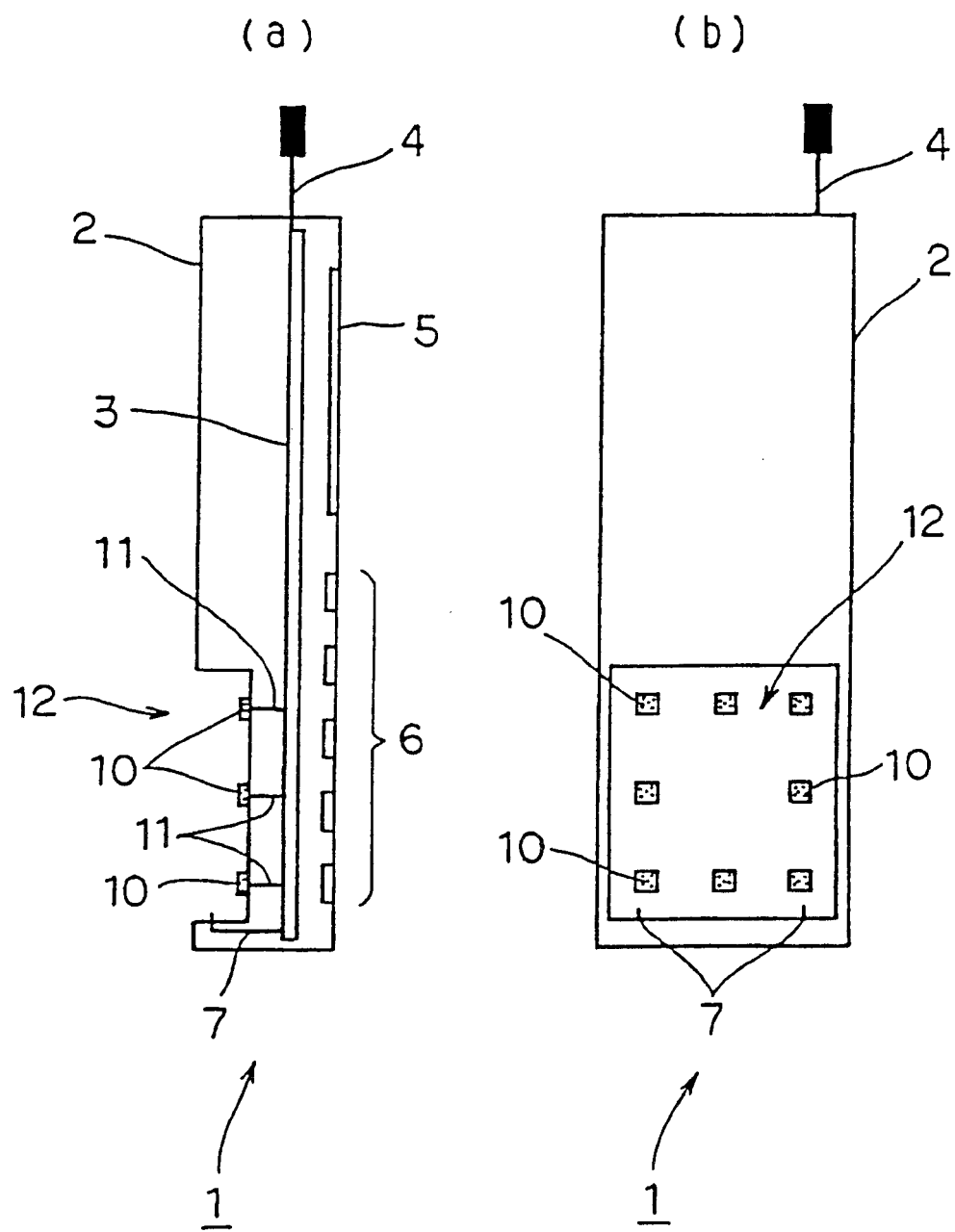

F I G. 10
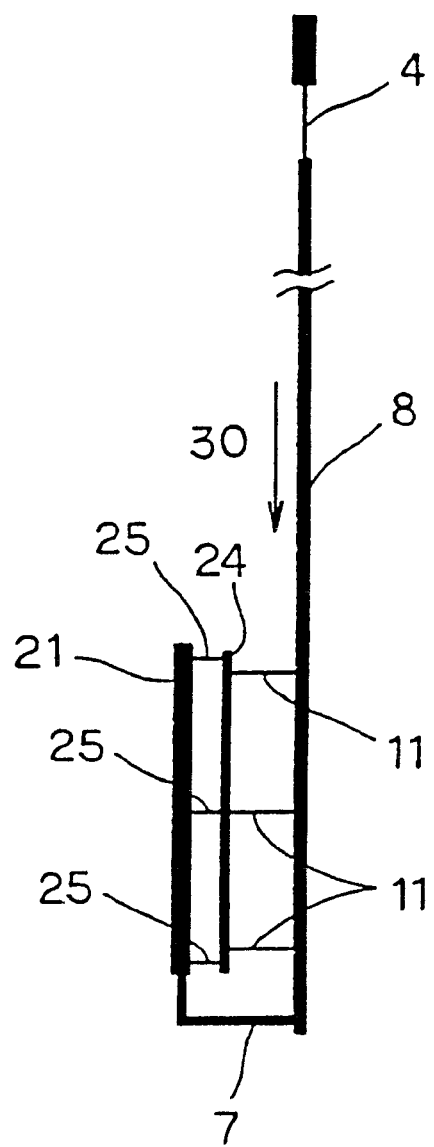

F I G. 12
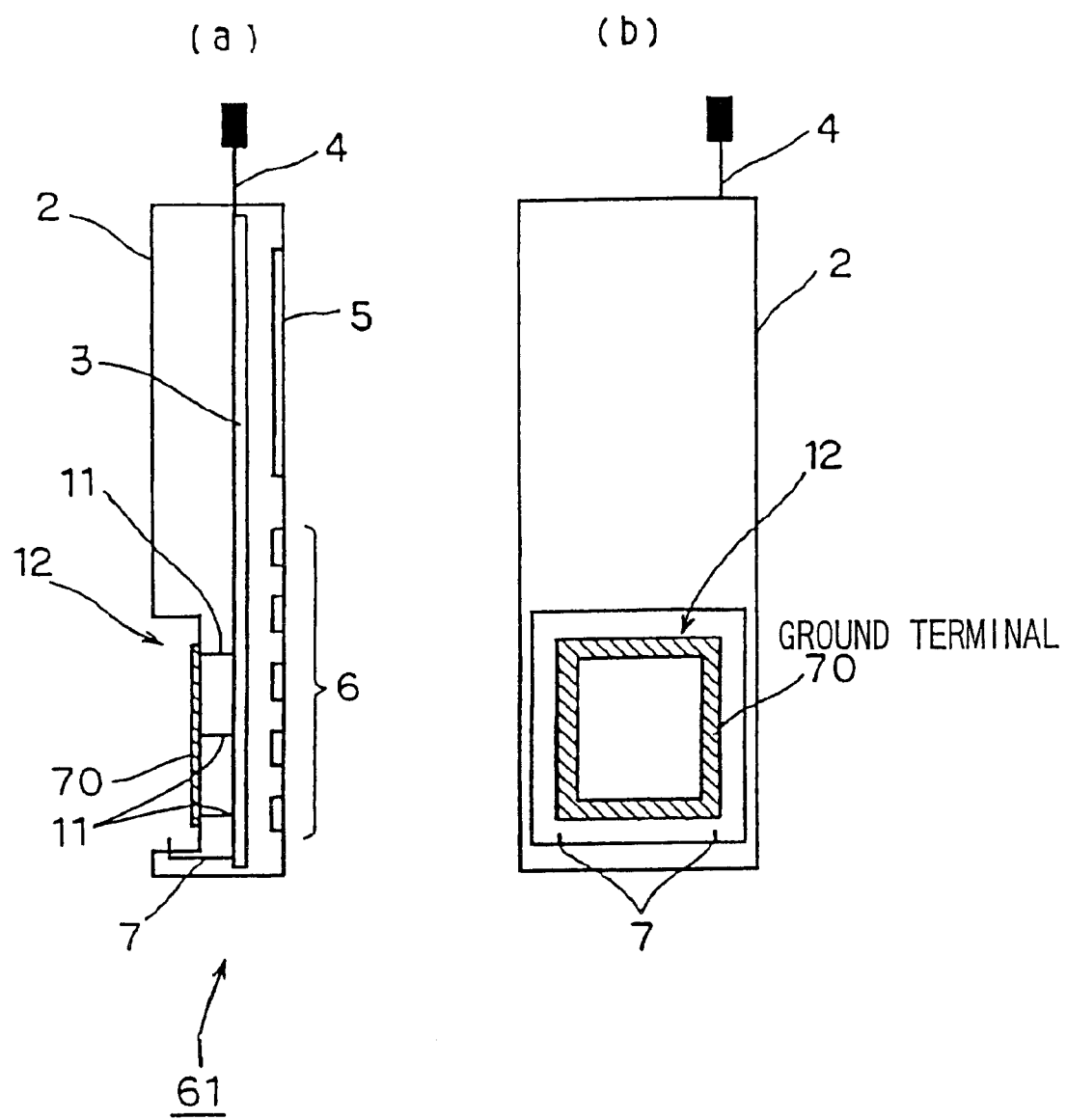

F I G. 13
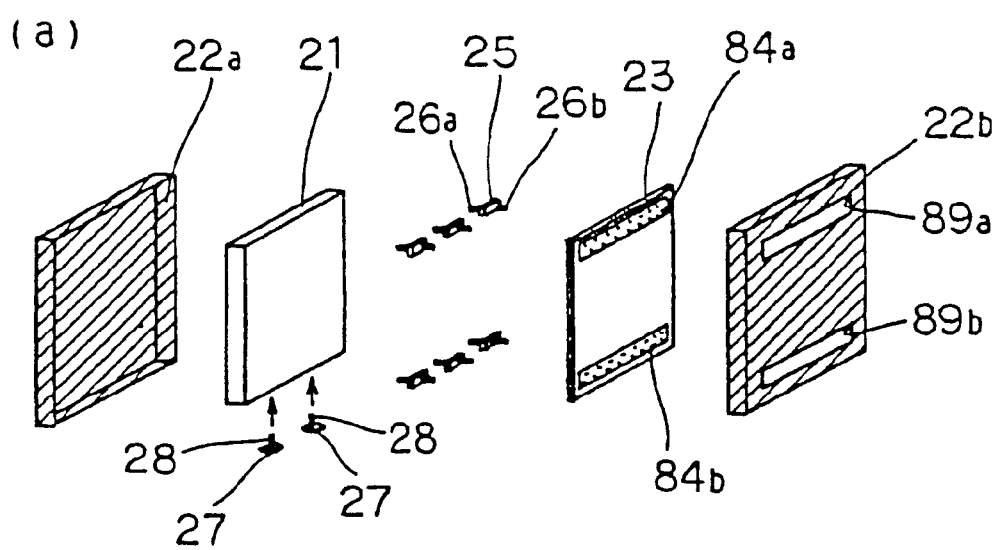
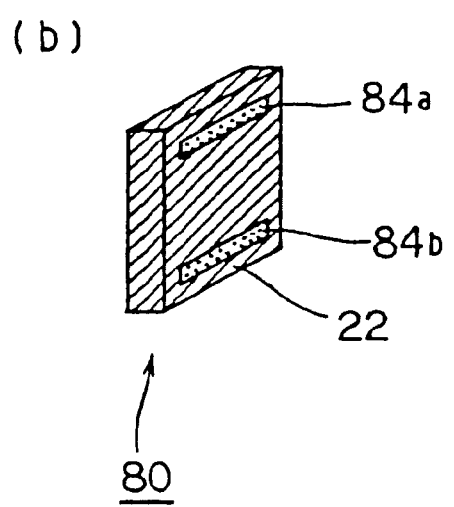

F I G. 14
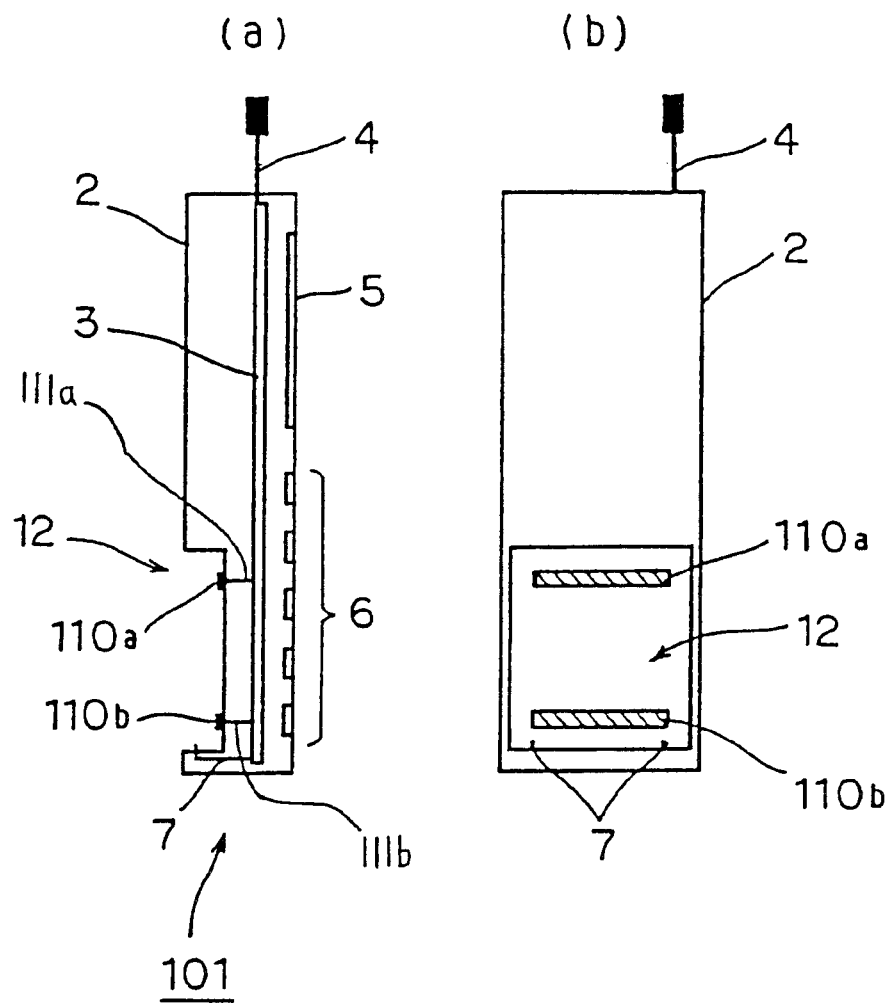

F I G. 15
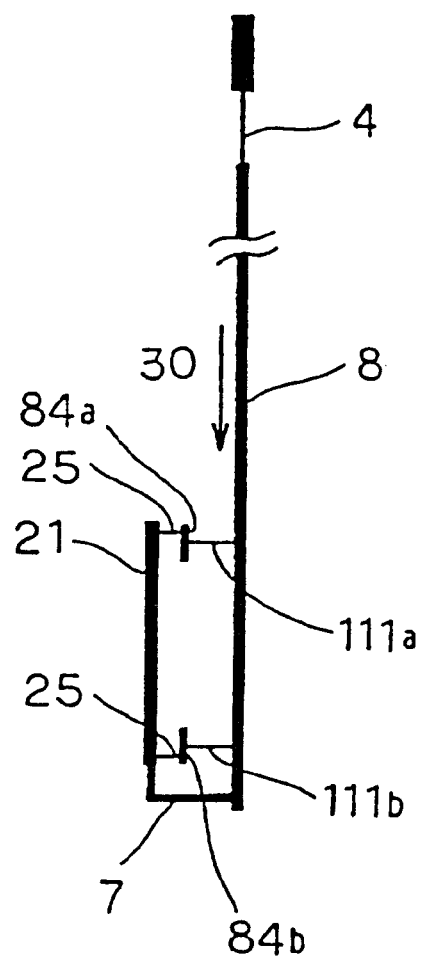

PORTABLE COMMUNICATION APPARATUS

TECHNICAL FIELD

The present invention relates to a portable communication apparatus such as a portable telephone on which a battery pack is attachably and detachably installed and a battery pack.

BACKGROUND ART

Referring to drawings, description will be given of a basic configuration of a conventional and typical portable telephone. FIG. 1 shows a conventional portable telephone in a state in which a battery pack is installed therein, and (a) is a side view and (b) is a rear view. FIG. 2 shows the conventional portable telephone in a state in which the battery pack is removed therefrom, and (a) is a front view, (b) is a cross-sectional view, and (c) is a rear view.

As shown in FIGS. 1(a) and 1(b) and FIG. 2(a), the conventional and typical portable telephone 201 includes a main section 202 including an outer housing; and in the main section 202, a printed circuit board 203 on which a radio circuit, a control circuit (not shown), and the like are mounted is integrally disposed; and an antenna 204 electrically connected to the radio circuit is disposed on an end section side of the circuit board 203.

In the main section 202, a liquid crystal display section 205 and a keypad section 206 are disposed in a front surface side thereof as shown in FIG. 2(a); and an installation depression section 212 in which a battery pack 220 is attachably and detachably installed is disposed on a rear surface side as shown in FIG. 2(c). The depression section 212 is ordinarily formed to be substantially equal in an outer size and a contour to the battery pack 220 such that the pack 220 is just completely housed therein. In the depression section 212, there are disposed a set of power source pins 207 to be electrically connected to electrode terminals 227, which will be described later, on the battery pack 220 side.

Each power source pin 207 is electrically connected to a power source line or ground (not shown) formed on the printed circuit board 203. And at installation of the battery pack 220, two power source pins 207 are respectively connected to the respective electrode terminals (a positive electrode terminal and a negative electrode terminal) of the battery pack 220 such that power source (direct current) is supplied from the battery pack 220 to the circuit board 203.

FIGS. 3 and 4 show a battery pack: FIG. 3(a) is a disassembled view; FIG. 3(b) is a perspective view; FIG. 4(a) is a front cross-sectional view; FIG. 4(b) is a side cross-sectional view; FIG. 4(c) is a bottom view.

As shown in FIGS. 3 and 4, the conventional and typical battery pack 220 includes a case 222 formed using a plastic, a mold resin, or the like, a battery can 221 formed using metallic material such as aluminum and an alloy, and electrode terminals 227 (a positive electrode terminal and a negative electrode terminal) to obtain the power source. In this regard, a protective circuit and the like, not shown, are also mounted on the battery pack 220.

The case 222 is subdivided into a pair of a first shell 222a and a second shell 222b, and case structure is formed by engaging these first and second shells 222a and 222b with each other or by joining the shells 222a and 222b with each other by an adhesive or the like. And the battery can 221, the electrode terminals 227, and the protective circuit described above are housed in the case 222 to configure the battery pack 220.

As shown in FIGS. 3(a) and 4(a), for the power source of the battery pack 220, there has been disclosed a configuration in which positive potential and negative potential generated in the battery can 221 are obtained via the respective electrode terminals 227 (a positive electrode terminal and a negative electrode terminal) electrically connected to connection leads (reference is to be made to, for example, patent document 1). For example, in the configuration of a lithium ion battery, the battery can is a positive electrode (positive direct-current potential), but the positive electrode terminal is directly connected via the connection lead 228 to the battery can 221. Incidentally, as shown in FIGS. 4(a) and 4(b), the respective electrode terminals 227 are arranged in a depression section 222c disposed on an end surface of the case 222 and are placed at inner positions lower than the end surface of the case 222.

As already shown in FIG. 1, in the portable telephone 201 in a state in which the battery pack 220 is appropriately housed to be installed in the installation depression section 212, when the electrode terminals 227 on the battery pack 220 side are connected to the power source pins 207 on the main section 202 side with polarity matched therebetween, power is supplied from the battery pack 220 to the printed circuit board 203.

In this regard, the main section providing the installation depression section 212 in which the battery pack 220 is installed and the outer housing is generally formed using a non-metallic material, for example, a plastic or a mold resin to secure the insulation state with respect to the battery pack 220.

Patent Document 1: Japanese Patent Laid-Open Pub. No. 2003-249208
Patent Document 2: Japanese Patent Laid-Open Pub. No. 2003-348202

DISCLOSURE OF INVENTION

Problem to be Solved by the Invention

The portable telephone uses a frequency band of, for example, around 1 GHz such as the 900 MHz band, or several GHz such as the 1.5 GHz band or 2 GHz band. In the conventional portable telephone described above, such a high-frequency current is fed through an antenna to communicate with a base station. In the case of a general portable telephone, the high-frequency current also flows through, in addition to the antenna, the printed circuit board (reference is to be made to, for example, patent document 2). Particularly, a ground layer is generally arranged in an inner layer of the printed circuit board, the ground layer having a relatively large area and being substantially equal in its size to a principal surface of the printed circuit board, and hence the high-frequency current flows through the ground layer.

Incidentally, it is general in structure that the power source pins disposed in the main section include a power source pin on the negative polarity side which is connected to the ground layer disposed in the inner layer of the printed circuit board and a power source pin on the positive polarity side which is connected to the power source line disposed in an inner layer of the printed circuit board. Additionally, at the position of the power source line connected to the power source pin on the positive polarity side, a decoupling capacitor to suppress high-frequency noise is connected in many cases between the power source line and the ground layer with the shortest distance therebetween. Therefore, since the capacitor has quite small impedance in the high-frequency band, the positive polarity terminal of the battery pack behaves with respect to the high frequency as if it were connected to the ground layer of the printed circuit board.

FIG. 5 shows an electrically equivalent model representing the configuration. The equivalent model is a model formed in consideration of a conductive path of a high-frequency current 30 flowing from the side of an antenna 204 as shown in FIG. 5, and the conductive path includes the ground layer 208 of the printed circuit board 203, the battery pin 207, and the battery can 221.

In the case of such structure, as disclosed in patent document 2, for the high-frequency current 230 flowing from the antenna side, the battery can 221 and the ground layer 208 forms parallel planar plate structure with the power source pin 207 as a short-circuit point. And on the ground layer 208 of the printed circuit board 203 opposing the battery pack 220 just therebeneath, a stationary wave occurs due to influence of reflection by the battery pin 207, and hence the high-frequency current 230 tends to become larger.

Therefore, if a Large-Scale Integrated circuit (LSI) is mounted on the printed circuit board just beneath the battery pack, part of such high-frequency current flows via the power source pin into the LSI. Consequently, for the LSI or the like with relatively low immunity with respect to the high-frequency current, the LSI characteristic is lowered due to the mixed high-frequency current. It is hence not possible to secure the satisfactory operation characteristic in some cases.

As the conventional technique to remove the above problem, there has been known a method in which the LSI itself is coated with a metallic shielding cover. In this structure, the shielding cover connected to the ground is disposed to coat the LSI to prevent the flowing of the high-frequency current into the LSI. However, the number of shielding covers increases in proportion to that of devices to be coated, and there arises inconvenience of increase in the number of parts.

Also, patent document 2 defines shielding structure focusing on a battery employed in the portable telephone. Patent document 2 discloses, as a shielding technique using the battery (or a secondary battery) employed in the portable telephone, a configuration in which a conductive outer cover of the battery is grounded to the circuit board. However, the battery actually employed in the portable telephone is configured in "battery pack" which can be attached to and detached from the installation depression section.

Therefore, if the battery pack 220 is installed for use in the installation depression section 212 of the portable telephone 201, for example, as shown in FIG. 2(*b*) and FIGS. 3(*a*) and 3(*b*), the battery side and the installation depression section side must have some mechanism to establish electronic connection on contact surfaces of the battery pack and the installation depression section. However, it cannot be said that patent document 2 has fully disclosed such concrete structure for the installation depression section and the battery pack of the portable telephone.

It is therefore an object of the present invention to provide a portable communication apparatus in which the high-frequency current flowing in the LSI arranged on the circuit board just beneath the battery pack is suppressed to prevent the lowering of the LSI characteristic and which can thereby secure the good operation characteristic.

Means for Solving the Problem

To achieve the above object, the portable communication apparatus in accordance with the present invention includes an installation section in which a battery pack housing a battery can therein and including at least one conductive surface on an outer circumference surface connected to the battery can for a high frequency current to run through and a circuit board disposed therein. Also, the installation section includes, on a surface thereof to which the conductive surface of the battery pack opposes, at least one ground terminal electrically connected to ground of the circuit board; an antenna is disposed on the circuit board; and in the battery pack, on a surface parallel to a principal surface of the circuit board when the battery pack is installed in the installation section, a pair of a first conductive surface and a second conductive surface which oppose each other are respectively disposed.

Furthermore, in the battery pack, a longitudinal direction of the conductive surfaces when the battery pack is installed in the installation section is arranged to intersect with a direction in which the high frequency current propagates from the antenna side.

According to the portable communication apparatus configured as above in accordance with the present invention, the battery can and the conductive surface are grounded to the ground of the circuit board to suppress the high frequency current flowing on the circuit board just beneath the battery pack to hence prevent the lowering of the operation characteristic of electronic parts mounted on the circuit board just beneath the battery pack, and hence operation reliability of the portable communication apparatus is satisfactorily secured.

Additionally, the battery pack in accordance with the present invention includes a battery can, a case to house therein the battery can, and a conductive surface connected to the battery can for a high frequency current to run through, the battery pack being installed in an electronic apparatus comprising an installation section in which the battery pack is attachably and detachably installed and a circuit board disposed therein.

Moreover, the case includes, on a side surface parallel to a principal surface of the circuit board when the battery pack is installed in the installation section, a pair of a first conductive surface and a second conductive surface which oppose each other.

Furthermore, an antenna is disposed on the circuit board of the electronic apparatus; in the case, a longitudinal direction of the conductive surfaces when the battery pack is installed in the installation section is arranged to intersect with a direction in which a high frequency current propagates from the antenna side.

In this connection, in accordance with the present invention, the high frequency indicates and includes a frequency band, for example, a band near 1 GHz such as the 900 MHz band or a several-gigahertz band such as the 1.5 GHz band or 2 GHz band.

Advantages of the Invention

As described above, according to the portable communication apparatus and the battery pack in accordance with the present invention, it is possible to suppress the high-frequency current flowing on the circuit board just beneath the battery can of the battery pack. Therefore, the lowering of the operation of the electronic parts mounted on the circuit board is prevented and hence the operation reliability of the portable communication apparatus is favorably secured.

Best Mode for Carrying Out the Invention

Referring next to drawings, description will be given of concrete embodiments of the present invention.

First Embodiment

FIGS. 6 to 8 are diagrams showing a portable telephone in a first embodiment of the present invention.

FIG. 6 shows a portable telephone with the battery pack installed. FIG. 7 shows the portable telephone with the battery pack removed. FIG. 7 (*a*) is a cross-sectional view (a cross section passing the ground terminal), and (*b*) is a rear view. FIG. 8 shows a battery pack. FIG. 8 (*a*) is a disassembled view, and (b) is a perspective view. FIG. 9 is a cross-sectional view showing the battery pack.

As shown in FIG. 6 and FIGS. 7(*a*) and 7(*b*), the portable telephone 1 of the embodiment includes a main section 2 including an outer housing, and the main section 2 includes therein a printed circuit board 3 on which a radio circuit, a control circuit (not shown), and the like are mounted. On one end of the printed circuit board 3, disposed is an antenna 4 electrically connected to the radio circuit. Furthermore, in the inner layer of the printed circuit board 3, a ground layer is disposed with an area substantially equal to that of a principal surface of the circuit board 3.

On the front surface side of the main section 2, a liquid-crystal display section 5 to display various information pieces and a keypad section 6 to conduct various operations are arranged. On the rear surface side, an installation depression section 12 in which the battery pack 20 is attachably and detachably installed is arranged as shown in FIG. 7(*a*). The depression section 12 is ordinarily formed to be substantially equal in an outer size and a contour to the battery pack 20 such that the pack 20 is completely housed therein. On the circumferential surface of the depression section 12, there are disposed a set of power source pins 7 to be electrically connected to electrode terminals 27, which will be described later, on the battery pack 20 side. Each power source pin 7 is electrically connected to a power source line or ground (not shown) formed on the circuit board 3.

As shown in FIG. 6 and FIGS. 7(*a*) and 7(*b*), the installation depression section 12 includes an inner surface onto which the battery pack 20 is pushed. A plurality of ground terminals 10 made of a conductive material having conductivity, a metallic material for example, is disposed on the inner surface. These terminals 10 have rectangular connection surfaces and are arranged in a rectangle shape along an inner surface of the depression section 12 with a predetermined interval.

In the embodiment, as an example, eight ground terminals 10 having a predetermined area are disposed on the inner surface of the depression section 12. Each of the ground terminals 10 is connected to one of metallic pins 11 to be electrically connected via pin passing holes (not shown) disposed on the inner surface of the depression section 12 to a ground layer (not shown) of the printed circuit board 3. Therefore, each of the ground terminals 10 and the ground layer are electrically connected via the metallic pins.

As shown in FIGS. 8(*a*) and 8(*b*) and FIG. 9, the battery pack 20 to be installed in the depression section 12 includes a case 22 formed of, for example, plastic, mold resin, or the like, a battery can formed of metallic material, e.g., aluminum or alloy, electrode terminals 27 (a positive electrode and a negative electrode) to obtain power source, and a printed circuit board 23 on which a protective circuit or the like are mounted.

The case 22 is subdivided into a pair of a first shell 22*a* and a second shell 22*b*, and the case structure is formed by engaging these first and second shells 22*a* and 22*b* with each other or by joining the shells 22*a* and 22*b* with each other by an adhesive or the like (not shown). And the battery can 21, the electrode terminals 27, and the protective circuit described above are housed in the case 22 to configure the battery pack 20.

For the power source of the battery pack 20, the positive potential and the negative potential generated on the battery can 21 and in the battery can 21 are obtained via the respective electrode terminals 27 (a positive electrode terminal and a negative electrode terminal) electrically connected to connection leads 28.

And in the battery pack, a metallic surface 24 as a conductive surface occupies part of a circumferential surface that faces the inner surface of the installation depression section 12 when the pack 20 is installed in the depression section 12. The metallic surface 24 is formed on the printed circuit board 23 with an area slightly smaller than that of the principal surface of the circuit board 23 as shown in FIG. 8(*a*). Also, the metallic surface 24 is not limited to the configuration in which the surface 24 is formed using metallic material; for example, the surface 24 may be formed using a conductive material such as a conductive resin.

Incidentally, FIG. 8(*a*) shows an example of the configuration using a so-called two-sided substrate as the printed circuit board 23. In this case, the metallic surface 24 is formed on the rear surface of the circuit board 23. Furthermore, for example, if a multilayer substrate is employed as the circuit board 23, an outer-most layer is used as a metallic surface with a desired size. In addition, a substrate with high flexibility such as a flexible substrate may also be employed.

On the printed circuit board 23, a plurality of capacitors 25 (referred to as chip capacitors 25 hereinbelow) in a fine-sized chip shape with an outer size equal to or less than several millimeters are respectively disposed near a circumference of the metallic surface 24. Respective terminals of each chip capacitor 25 are respectively linked with a connection terminal 26*b* connected to the metallic surface 24*a* and a connection line 26*a* connected to the battery can 21. That is, one of the terminals of the chip capacitor 25 in a two-terminal configuration is connected to the battery can 21 via the connection line 26*a* such as a connection lead that is attached, for example, by ultrasonic welding. The other one terminal of the chip capacitor 25 in a two-terminal configuration is connected to the metallic surface 24 via the connection line 26*b*, i.e., a connection member running through the printed circuit board 23 in a thickness direction, the connection line 26*b* being such as a so-called via hole.

Additionally, the shell 22*b*, one of the shells constituting the case 22 of the battery pack 20, has an opening 29 with an area almost equal to that of the metallic surface 24 on a side surface that is pushed onto the inner surface of the depression section 12. As shown in FIG. 8(*b*), in a state in which the battery can 21 and the printed circuit board 23 are housed in the case 22 to configure the battery pack 20, the metallic surface 24 is exposed from the opening 29 to be on a side surface that is pushed to the inner surface of the depression section 12 of the portable telephone 1. The metallic surface 24 is on the same plane with the surface of the case 22 or is placed lower than the surface of the case 22, namely, nearer the printed circuit board 23 in relation to the surface of the case 22.

And in the portable telephone 1, while the battery pack 20 is appropriately housed and installed in the depression section 12, the electrode terminals 27 on the battery pack 20 side and the power source pins 7 on the main section 2 side are connected to each other with polarity matched therebetween, and then power is supplied from the battery pack 20 to the printed circuit board 3. Also, when the battery pack 20 is installed in the depression section 12, one surface of the case 22 to be pushed to the inner surface of the depression section 12 is parallel to the principal surface of the circuit board 23.

In the embodiment, as chip capacitors 25 electrically connecting the metallic surface 24 to the battery can 21, there may be employed capacitors with quite a general value of electric capacity ranging, for example, from about several picofarad to about several hundreds of microfarad. And in the high-frequency band (near 1 GHz or the several-GHz band) employed by the portable telephone, impedance of the capacitor (=1/ωC, ω is a frequency, C is capacity of capacitor) is very small, and hence the state may be treated as a short-circuited state. Consequently, in such high-frequency band, since the metallic surface and the battery can is in a short-circuited state in which they are electrically connected via the capacitors to each other, these components may be regarded as a united structure, namely, a conductive structure including the metallic surface and the battery can electrically connected via the capacitors to each other.

As shown in FIG. 6, when the battery pack 20 is installed in the depression section 12 of the portable telephone 1, all of the plural ground terminals 10 disposed in the depression section 12 are brought into contact with the metallic surface 24 constitute part of the circumferential surface of the battery pack 20. In this regard, since the ground terminals 10 are actually formed with quite a small thickness, they are schematically shown in consideration of thickness in FIG. 7(a); however, they are actually very thin and hence are not shown in FIG. 6 indicating a state in which the battery pack is installed.

In the installed state, the ground terminal 10 is connected via the metallic pin 11 to the ground layer of the printed circuit board 3. Also, in the configuration, the metallic surface 24 of the battery pack 20 is connected via the chip capacitor 25 to the battery can 21, and a high-frequency current runs through them.

Therefore, the portable telephone 1 in which the battery pack 20 is installed in the depression section 12 is of a configuration that in the high-frequency band, like an equivalent model formed by giving consideration to a current guide path in FIG. 10, the battery can 21 and the metallic surface 24 are unified via the chip capacitors 25 and are grounded to the ground layer 8 of the circuit board 3 at a position of the electric pins 11 connected to the ground terminals 10 (which are very thin and hence are not shown as in FIG. 6). Incidentally, the electromagnetic shielding structure is a duplicated structure including "electromagnetic shielding structure by the battery can 21" and "electromagnetic shielding structure by the metallic surface 24". For example, when compared with the case using only the metallic surface or only the battery can, the impedance can be further lowered due to the increase in the surface area and so on.

The configuration described above is a configuration including an electromagnetic shielding function against the high-frequency current 30 propagating on the circuit board 3 from the antenna 4 side, leading to an advantage to prevent the propagation of the current 30 from reaching a position facing the battery pack 20. That is, since the periphery section of the battery can 21 and the metallic surface 24 are grounded via the metallic pins 11 to the ground layer 8 of the circuit board 3, part of the current 30 flowing through the ground layer 8 branches at the position of each metallic pin 11. As a result, it is possible to reduce the high-frequency current flowing into the ground layer 8 just beneath the battery pack 20.

Incidentally, the battery pack 20 has a feature that the battery can 21 formed with a metallic material is not used simply as "metallic surface", but the metallic surface 24 is further constructed, for example, as shown in FIG. 8(a).

If the side surface of the battery can facing the inner surface of the depression section is employed as "metallic surface" as called in the present invention and is formed to be exposed on the circumferential surface of the battery pack, direct-current potential of polarity possessed by the battery can appears on the side surface of the battery can. For example, for a lithium-ion battery, the battery can itself is a positive electrode, and hence positive direct-current potential appears on such "metallic surface". Also, for the "metallic surface", the side surface of the battery can is exposed on the circumferential section of the battery pack. When consideration is given to the use thereof in an actual environment of usage, it is not advantageous that "metallic surface" has direct-current potential in order to avoid influence of electric contact with the different electrode, namely, influence of, for example, a short circuit between the positive electrode and the negative electrode.

Therefore, in the present embodiment, there is employed a configuration in which a metallic surface is newly disposed as an electromagnetic shielding configuration other than the battery can. And capacitors are disposed between the metallic surface and the battery can to prevent the presence of the direct-current potential on the metallic surface. That is, as described above, in the high-frequency band, the capacitors function such that a conductive state is established between the battery can and the metallic surface, and the metallic surface is part of the shielding structure. On the other hand, for the direct current, the capacitors behave as an insulator, and hence a direct current does not run between the metallic surface and the battery can, and the direct-current potential of the polarity possessed by the battery can does not appear on the metallic surface. As above, the present invention has a feature in which by the capacitors integrally included in the battery pack, the electric behavior appearing on the metallic surface is varied between the direct current and the high-frequency band.

As described above, the conventional configuration is accompanied by a disadvantage in which due to the influence of the battery pins which connects the battery can on the battery pack side with the ground layer on the portable telephone side for a high frequency current, a stationary wave remains between the battery can and the ground layer. As a result, the high-frequency current increases on the ground layer just beneath the battery can.

However, according to the battery pack 20 of the embodiment and the portable telephone 1 in which the battery pack 20 is installed, the side surface of the battery can 21 and the metallic surface 24 are grounded to the ground layer 8 at a plurality of positions of the circumferential section thereof to construct a so-called electromagnetic shielding configuration, and hence it is possible to suppress the high-frequency current on the printed circuit board 3 just beneath the battery can 21. In consequence, in the portable telephone 1, the lowering of the operation characteristic of the LSI mounted on the circuit board 3 can be suppressed, and the operation reliability of the portable telephone 1 can be satisfactorily secured.

Second Embodiment

In the Battery Pack in Accordance with the Present Invention, the contour of the metallic surface disposed on the circumferential surface of the case can be changed to an arbitrary contour and arbitrary size. In the first embodiment described above, the metallic surface 24 is configured to be disposed in an area substantially equal to the entire area of one side surface of the battery pack 20. However, the metallic surface can be subdivided into a plurality of small-area sections to configure the metallic surface using a group of these small metallic surfaces. Incidentally, since the battery pack of the second embodiment is almost equal in the basic configuration to that of the first embodiment, the same positions and the same members as those of the first embodiments are assigned with the same reference numerals and description thereof will be avoided.

As shown in FIGS. 11(a) and 11(b), in the battery pack 40, a plurality of small metallic surfaces 44 are arranged on one principal surface of the printed circuit board 23 in a loop form configuring a rectangle along a circumferential section of the principal surface with a predetermined interval therebetween. Each small metallic surface 44 is formed in a rectangular shape with a predetermined area.

That is, the respective small metallic surfaces 44 are arranged at positions corresponding to the respective ground terminals 10 such that when the battery pack 40 is installed in the installation depression section 12 of the portable telephone 1 described above, the respective small metallic surfaces 44 are brought into contact for electric conduction respectively with the ground terminals 10 arranged on the inner surface of the depression section 12. Also, the small metallic surface 44 is formed with an area slightly larger than that of each ground terminal 10.

Moreover, on a surface of one of the shells 22b to be pushed to the inner surface of the depression section 12, a plurality of openings 49 to expose the respective small metallic surfaces 44 to the outside are respectively disposed at positions corresponding to the respective small metallic surfaces 44. And on a surface of the case 22 of the battery pack 40 to be pushed to the inner surface of the depression section 12, the respective small metallic surfaces 44 are exposed from the respective openings 49 as shown in FIG. 11(b).

In the configuration of the battery pack 40 of the embodiment, since the battery can 21 is connected via the chip capacitors 25 to the metallic surfaces 44, the electromagnetic shielding structure is constructed in a state in which the battery pack 40 is installed in the depression section 12. With an operation similar to that of the first embodiment, there is obtained an advantage in which the high-frequency current flowing on the printed circuit board 3 is suppressed.

Incidentally, in the first and second embodiments, there are adopted a configuration in which the chip capacitors 25 are mounted on the printed circuit board 23 to be arranged between the circuit board 23 and the battery can 21. However, the embodiments are not restricted to those configurations. The chip capacitors 25 may be mounted at arbitrary positions, for example, in a free space as far as the chip capacitors 25 electrically connect the battery can to the metallic surface in the configuration.

Third Embodiment

Furthermore, in the portable telephone in accordance with the present invention, it is possible to change a contour and a size of the ground terminals disposed on the inner surface of the installation depression section. Description will be given of an example, i.e., a portable telephone of another embodiment including ground terminals with another contour.

FIG. 12 shows a state of the portable telephone in the embodiment in which the battery pack is removed. FIG. 12 (a) is a cross-sectional view and (b) is a rear view.

As shown in FIGS. 12(a) and 12(b), the portable telephone 61 of the embodiment includes an installation depression section 12 in which, for example, a battery pack 40 is attachably and detachably installed. On an inner surface of the depression section 12, there are disposed ground terminals 70 to which a group of small metallic surfaces 44 of the battery pack 40 are pushed. The ground terminals 70 are formed in a shape of a rectangular loop, along a circumference of the inner surface of the depression section 12. The ground terminals 70 are disposed at positions corresponding to the small metallic surfaces 44 and are formed with, for example, conductive gaskets or pattern generation by deposition.

In this connection, according to the portable telephone 61 of the embodiment, when the battery pack 40 is installed as well as when, for example, even the battery pack 20 shown in FIG. 8 is installed, the metallic surfaces 24 and 44 of the battery packs 20 and 40 are satisfactorily brought into contact with the ground terminals 70 for conduction therebetween, and hence the advantage described above is similarly obtained.

Fourth Embodiment

Moreover, in the Present Embodiment, the Arrangement of the metallic surfaces disposed on the circumferential surface of the case of the battery pack and the arrangement of the ground terminals disposed in the installation depression section of the portable telephone may be arbitrarily changed.

In the embodiments described above, as described by referring to the equivalent model shown in FIG. 10, part of the high-frequency current 30 flowing from the side on which the antenna 4 is mounted branches at positions where the metallic pins 11 are disposed, and hence the advantage is obtained by use of structure in which the battery packs 20 and 40 include an electromagnetic shielding function with respect to such high-frequency current 30. Therefore, it is not necessarily required that along one surface to be pushed to the inner surface of the depression section 12 or along the entire circumference of a side surface, grounding be implemented onto the ground layer 8 of the printed circuit board 23, which is the case with the battery pack 40 of, for example, the second embodiment.

In an example, as shown in FIGS. 13(a) and 13(b), the battery pack 80 of the embodiment includes a pair of first and second metallic surfaces 84a and 84b disposed on a surface being a rectangle shape to be pushed to the inner surface of the depression section 12, along two edges facing each other. On a surface of the battery pack 80, the first metallic surface 84a is disposed, when the battery pack 80 is installed in the depression section 12, along an edge facing the side on which the antenna 4 is mounted. Also, on a surface of the battery pack 80, the second metallic surface 84b is disposed along an edge facing the first metallic surface 84a.

That is, in other words, the case 22 of the battery pack 80 has a pair of the first metallic surface 84a and the second metallic surface 84b on a rectangular surface parallel to the principal surface of the printed circuit board 23 along the two opposing edges; the longitudinal direction of the first and second metallic surfaces 84a and 84b intersects the direction in which the high-frequency current propagates from the antenna 4 side. The explanation was given to the battery pack 80 installed in the depression section 12.

Also, for one shell 22b of the case 22, a pair of openings 89 to expose the respective metallic surfaces 84a and 84b to the outside are disposed at positions corresponding to the respective metallic surfaces 84a and 84b on the side surface to be pushed to the inner surface of the depression section 12. Moreover, for the case 22 of the battery pack 80, the respective metallic surfaces 84a and 84b are exposed from the openings 89 on a surface to be pushed to the inner surface of the depression section 12 as shown in FIG. 13(b).

Next, description will be given of a portable telephone 101 in which the battery pack 80 described above is attachably and detachably installed. As shown in FIGS. 14(a) and 14(b), in the portable telephone 101 in which the battery pack 80 is installed, a pair of first and second ground terminals 110a and 110b to which the first and second metallic surfaces 84a and 84b of the battery pack 80 are respectively pushed are respectively disposed on the inner surface of the installation depression section 12. The respective ground terminals 110a and 110b are electrically connected via metallic pins 111a and 111b to the printed circuit board 3.

Therefore, when the battery pack 80 is installed in the depression section 12 of the portable telephone 101, the first metallic surface 84a is pushed to the first ground terminal 110a for conduction therebetween and the second metallic surface 84b is pushed to the second ground terminal 110b for conduction therebetween.

FIG. 15 shows an equivalent circuit model representing such structure. In the portable telephone 101, the battery can 21 is grounded to the ground layer 8 via the chip capacitors 25, the respective metallic surfaces 84a and 84b, and the metallic pins 111a and 111b as shown in FIG. 15 for a high frequency current to run through. The battery pack 80 forms an electromagnetic shielding configuration with respect to the high-frequency current 30 from the antenna 4 side. Such configuration means that on a surface of the case 22 of the battery pack 80, the first and second metallic surfaces 84a and 84b disposed along the two facing edges can be arranged in an arbitrary direction in consideration of the direction of propagation of the high-frequency current 30 to thereby form the electromagnetic shielding structure. More specifically, at installation of the battery pack in the portable telephone, it is only necessary to employ a configuration in which the first and second metallic surfaces arranged to oppose the case of the battery pack are arranged to face the end side of the printed circuit board on which the antenna is mounted. Such configuration forms electromagnetic shielding structure with respect to the high-frequency current flowing from the antenna mounting side as above, and hence there can be obtained the advantage described above.

Incidentally, the portable telephone in accordance with the present invention is not restricted by the portable telephone of the embodiments described above, but is favorably employed for other electronic apparatuses, for example, a Personal Digital Assistant (PDA) as far as the electronic apparatuses are configured such that the battery pack is arranged to oppose the circuit board in which the antenna is disposed.

BRIEF DESCRIPTION OF THE DRAWINGS

FIG. 3 shows a conventional and typical battery pack, and (a) is a disassembled perspective view and (b) is a perspective view.

FIG. 4 shows a conventional and typical battery pack, and (a) is a vertical cross-sectional view, (b) is a longitudinal cross-sectional view, and (c) is a bottom view.

FIG. 7 shows a state in which a battery pack is removed from the portable telephone, and (a) is a cross-sectional view and (b) is a rear view.

FIG. 10 is a schematic diagram showing an electric equivalent model representing the portable telephone.

FIG. 12 shows a state in which a battery pack is removed from the portable telephone of another embodiment, and (a) is a cross-sectional view and (b) is a rear view.

FIG. 13 shows a battery pack of still another embodiment employed in the portable telephone of the present embodiment, and (a) is a disassembled view and (b) is a perspective view.

FIG. 14 shows a state in which a battery pack is removed from the portable telephone of still another embodiment, and (a) is a cross-sectional view and (b) is a rear view.

FIG. 15 is a schematic diagram showing an electric equivalent model representing the portable telephone.

DESCRIPTION OF REFERENCE NUMERALS

Figure 1:
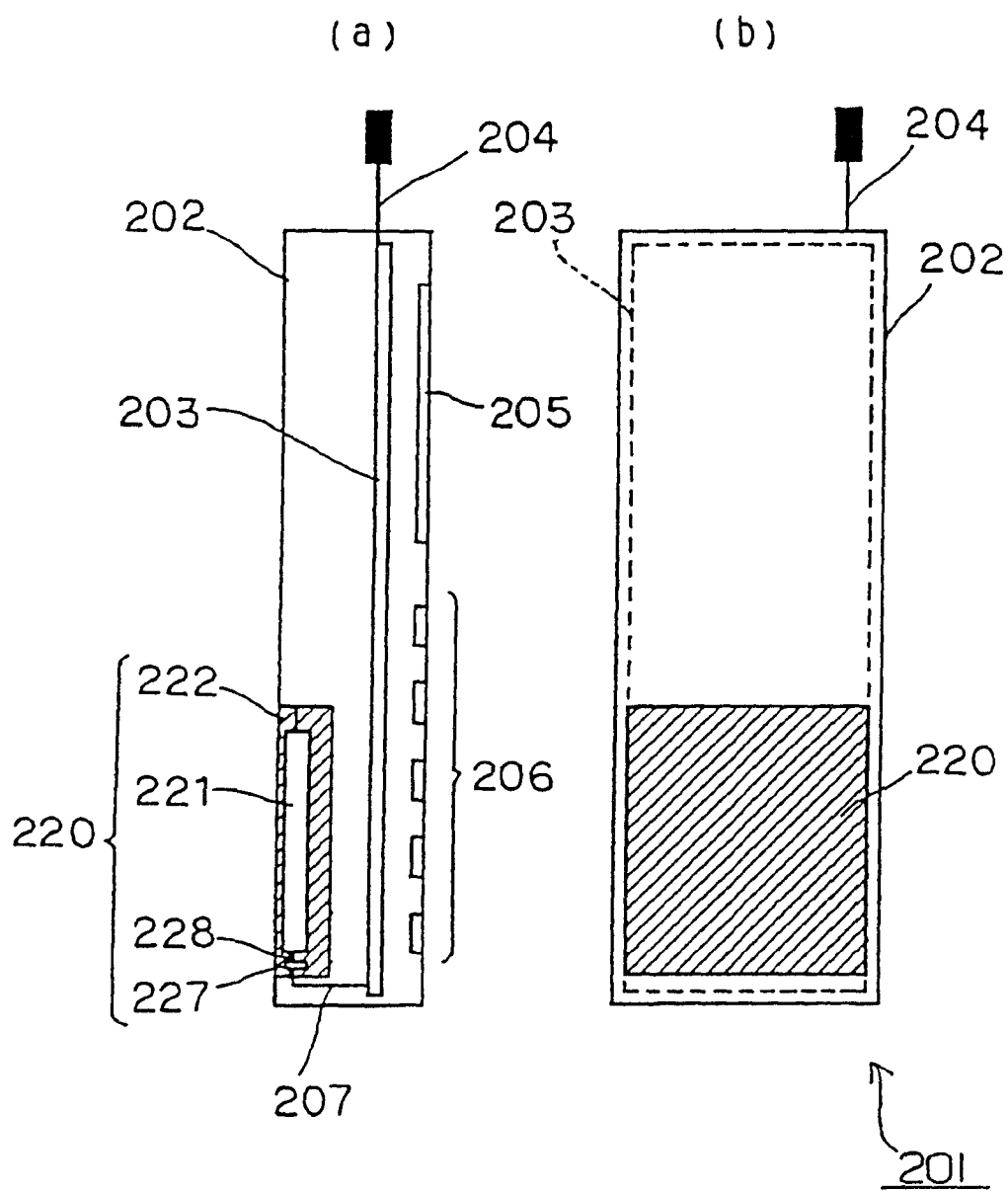
FIG. 1 shows a state in which a battery pack is installed in a conventional and typical portable telephone, and (a) is a cross-sectional view and (b) is a rear view.
Figure 2:
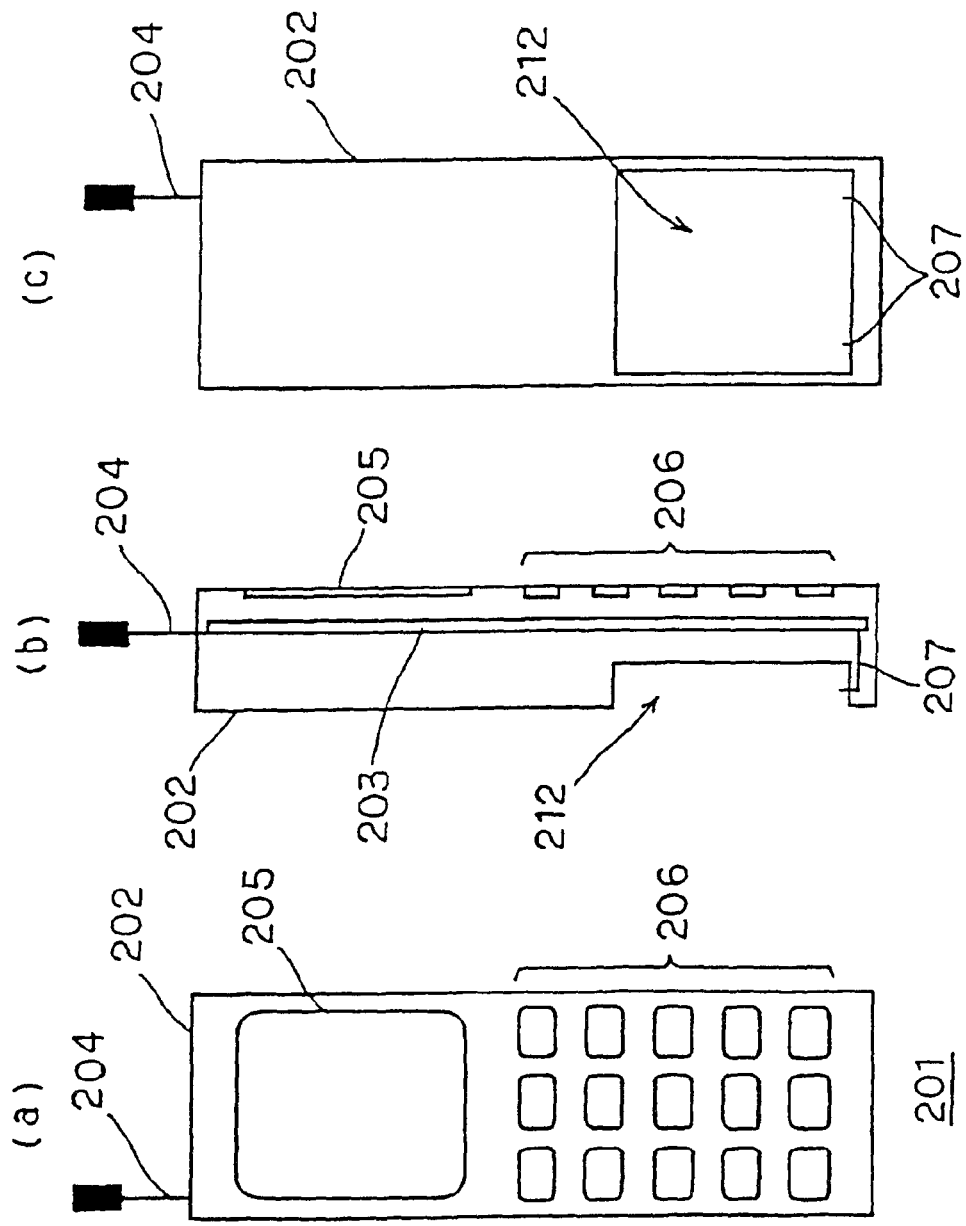
FIG. 2 shows a state in which a battery pack is removed from the conventional and typical portable telephone, and (a) is a front view, (b) is a cross-sectional view and (c) is a rear view.
Figure 5:
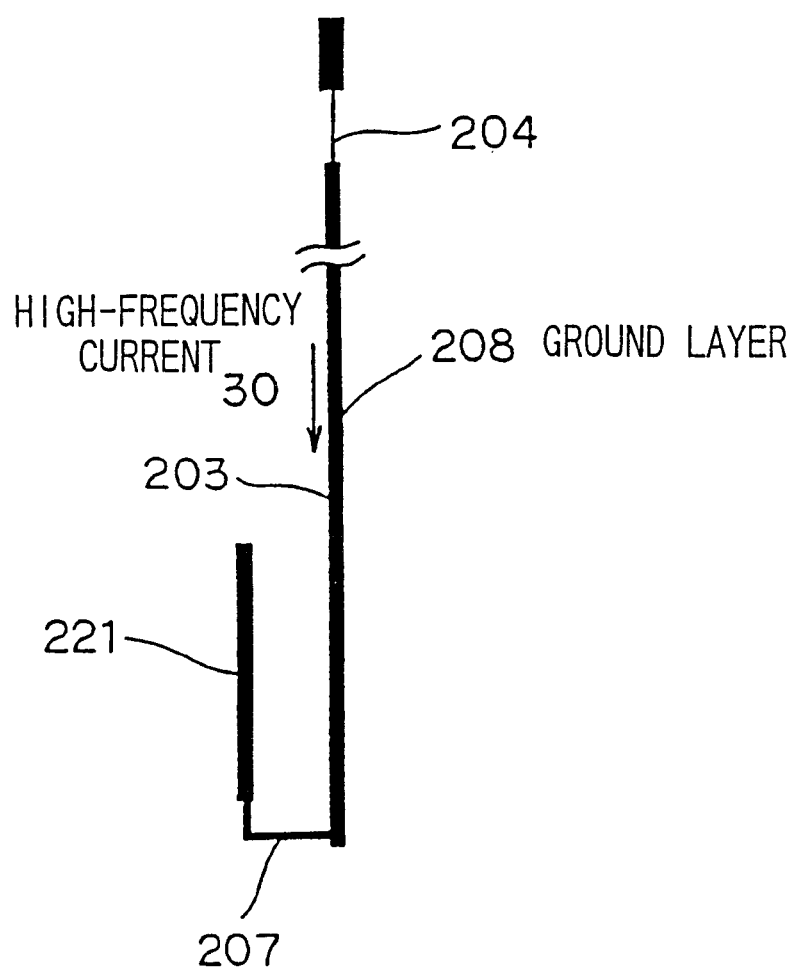
FIG. 5 is a schematic diagram showing an electric equivalent model representing a conventional and typical portable telephone.
Figure 6:
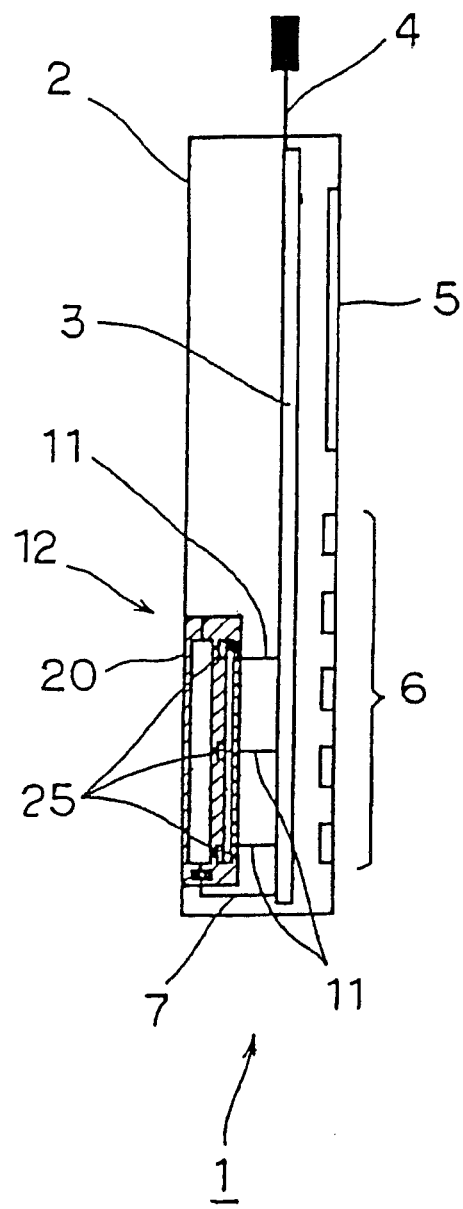
FIG. 6 is a cross-sectional view showing a state in which a battery pack is installed in a portable telephone of a first embodiment in accordance with the present invention.
Figure 8:
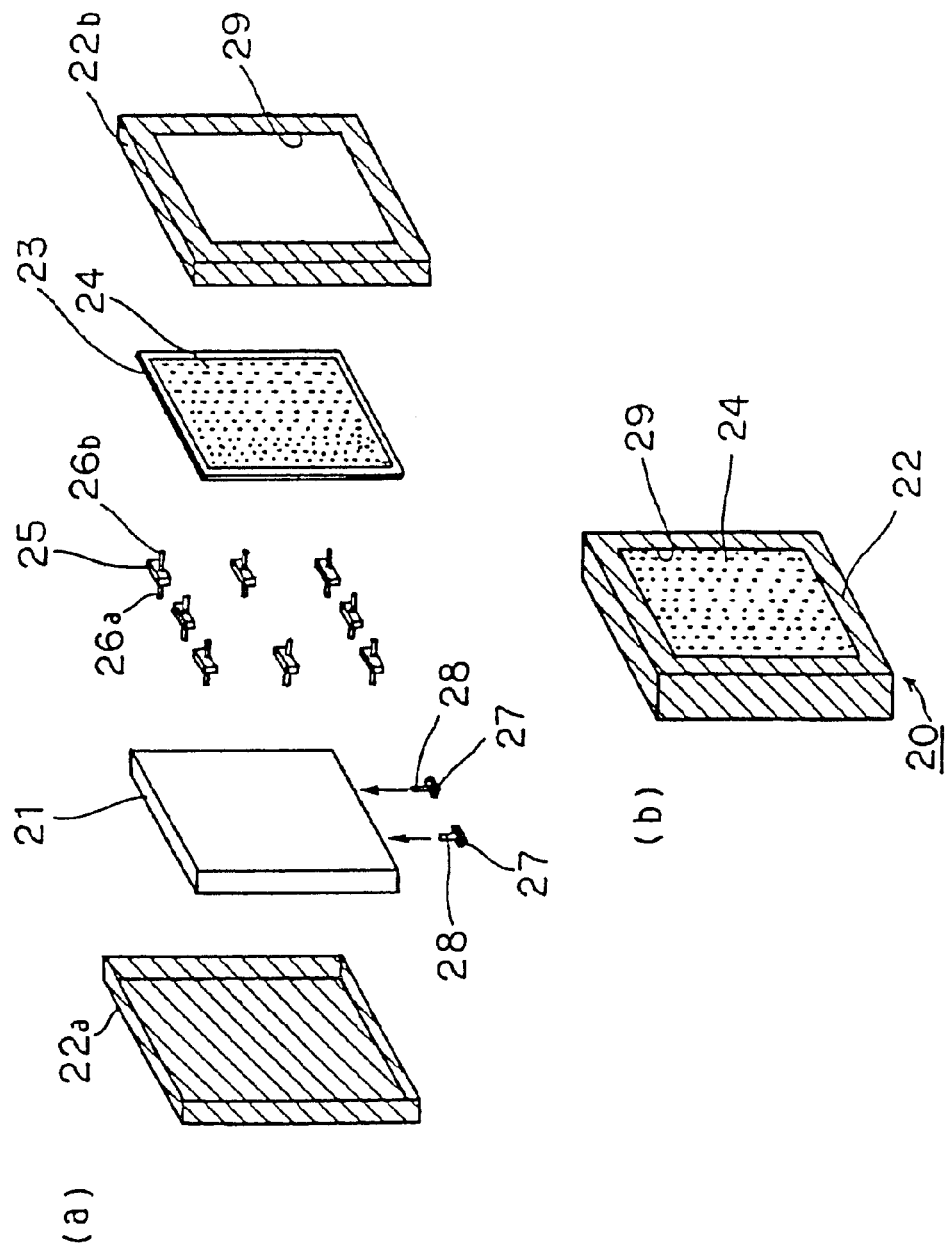
FIG. 8 shows the battery pack, and (a) is a disassembled view and (b) is a perspective view.
Figure 9:
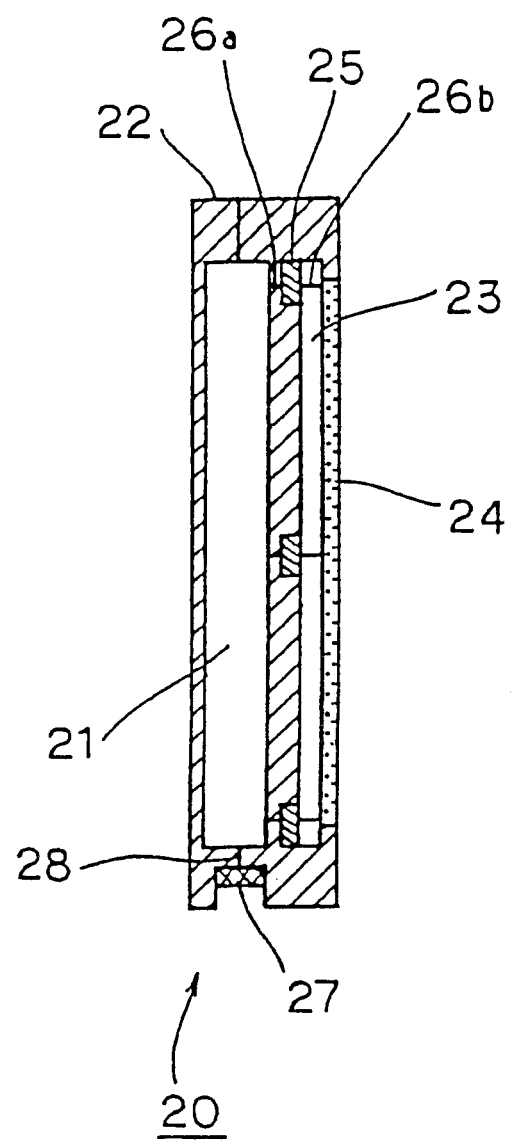
FIG. 9 is a cross-sectional view showing a battery pack.
Figure 11:
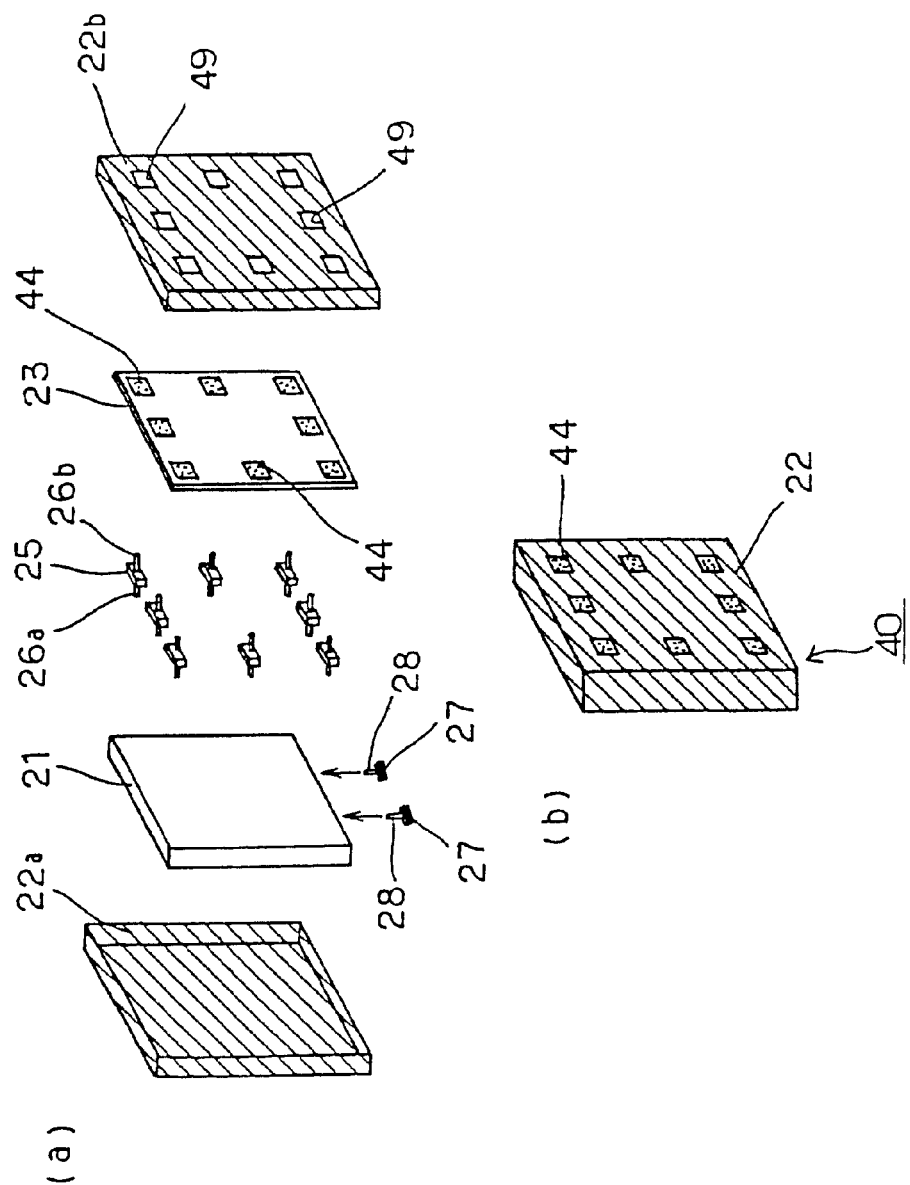
FIG. 11 shows a battery pack of another embodiment employed in the portable telephone of the present embodiment, and (a) is a disassembled view and (b) is a perspective view.

1 Portable telephone
2 Main section
Printed circuit board
4 Antenna
5 Liquid-crystal display section
6 Keypad section
7 Power source pin
8 Ground layer
Ground terminal
   11 Metallic pin
12 Installation depression section
20 Battery pack
21 Battery can
22 Case
23 Printed circuit board
24 Metallic surface
25 Chip capacitor
26 Connection line
27 Electrode terminal
28 Connection lead
29 Opening
30 High-frequency current

The invention claimed is:
1. A portable communication apparatus, comprising:
a circuit board disposed in the apparatus;
an antenna disposed on the circuit board;
a battery pack installed on an installation section of the apparatus;
a battery can included within the battery pack;
a plurality of ground terminals connected to a ground layer of the circuit board;
a pair of a first conductive surface and a second conductive surface formed on a circumferential surface of the battery pack, each having an elongated shape so as to be arranged side by side in parallel on a same plane along two edges facing each other; and a plurality of individual capacitors arranged along a longitudinal direction of the first conductive surface and the second conductive surface, respectively, and being respectively connected between the battery can and the first conductive surface and the second conductive surface through which high frequency current runs, respectively, wherein, on an inner surface of the installation section of the apparatus, a plurality of ground terminals are disposed so as to be pushed to the first and second conductive surfaces, and upon the battery pack being installed in the installation section, conduction is established between the first and second conductive surfaces and the ground terminals, and the longitudinal direction of the first and second conductive surfaces is arranged to intersect with a direction in which a high-frequency current propagates from an antenna side to form an electromagnetic shielding structure.

2. The portable communication apparatus in accordance with claim 1, wherein the individual capacitors are chip capacitors.

3. The portable communication apparatus in accordance with claim 2, wherein the chip capacitors are arranged with an interval on a surface parallel to a principal surface of the circuit board.

4. The portable communication apparatus in accordance with claim 1, wherein the battery pack forms an electromagnetic shielding structure upon the battery pack being installed in the installation section, and conduction is established between the first and second conductive surfaces and the ground terminal.

5. The portable communication apparatus in accordance with claim 1, wherein the apparatus includes on a rectangular surface parallel to a principal surface of the circuit hoard upon the battery pack being installed in the installation section, the pair of the first conductive surface and the second conductive surface along two opposing edges.

6. The portable communication apparatus in accordance with claim 1, wherein the first and second conductive surfaces are rectangular in shape and positioned in a longitudinal direction on the printed circuit board.

7. A portable communication apparatus, comprising:
a battery can;
a case housing the battery can; and
a pair or a first conductive surface and a second conductive surface each having an elongated shape so as to be arranged side by side in parallel on a same plane along two edges facing each other, and respectively connected via a plurality of chip capacitors to the battery can through which high frequency current runs, respectively, the chip capacitors being arranged along a longitudinal direction of the first conductive surface and the second conductive surface, respectively, wherein upon the battery pack being installed in the portable communication apparatus that includes an installation section on which the battery pack is attachably and detachably installed, and a circuit board disposed therein and an antenna disposed on the circuit board, wherein the case includes, on a rectangular surface parallel to a principal surface of the circuit board upon the battery pack being installed in the installation section, the pair of the first conductive surface and the second conductive surface along two opposing edges of the rectangular surface, and upon the battery pack being installed in the installation section, the longitudinal direction of the first and second conductive surfaces is arranged to intersect with a direction in which a high-frequency current propagates from an antenna side to form an electromagnetic shielding structure, wherein, on an inner surface of the installation section of the portable communication apparatus, a plurality of ground terminals which are connected to a ground layer of the circuit board and to which the first and second conductive surfaces are to be pushed are disposed, and upon the battery pack being installed in the installation section, conduction is established between the first and second conductive surfaces and the ground terminals.

* * * * *